(12) United States Patent
Bishop

(10) Patent No.: US 10,220,865 B1
(45) Date of Patent: Mar. 5, 2019

(54) COUP CLEANING CART

(71) Applicant: Mischa Bishop, Muscle Shoals, AL (US)

(72) Inventor: Mischa Bishop, Muscle Shoals, AL (US)

(*) Notice: Subject to any disclaimer, the term of this patent is extended or adjusted under 35 U.S.C. 154(b) by 3 days.

(21) Appl. No.: 15/679,713

(22) Filed: Aug. 17, 2017

(51) Int. Cl.
*B62B 3/02* (2006.01)
*B62B 3/10* (2006.01)
*B62B 3/12* (2006.01)

(52) U.S. Cl.
CPC ............. *B62B 3/104* (2013.01); *B62B 3/02* (2013.01); *B62B 3/12* (2013.01); *B62B 2202/50* (2013.01)

(58) Field of Classification Search
CPC .............. B62B 3/104; B62B 3/12; B62B 3/02
See application file for complete search history.

(56) References Cited

U.S. PATENT DOCUMENTS

| | | | |
|---|---|---|---|
| 7,374,185 B1* | 5/2008 | Hollis | B23K 9/323 280/35 |
| 9,580,096 B2* | 2/2017 | Beaver | B62B 3/10 |
| 2007/0187528 A1* | 8/2007 | Roth | B08B 3/026 239/146 |
| 2009/0096181 A1* | 4/2009 | Cole, Jr. | B62B 1/14 280/47.35 |
| 2011/0084070 A1* | 4/2011 | Martheenal | B65D 43/0222 220/200 |

* cited by examiner

*Primary Examiner* — James A Shriver, II
*Assistant Examiner* — James J Triggs
(74) *Attorney, Agent, or Firm* — Dennen IP Law, LLC

(57) ABSTRACT

A cart of the present disclosure has a frame, and the frame has a handle coupled to an axle and a cylindrical base. Further, the cart has at least two wheels coupled to the axle and at least a third wheel coupled to an underside of the cylindrical base. Additionally, the cart has a cylindrical housing removeably situated within the cylindrical base and a cylindrical insert removeably inserted within the cylindrical housing, the cylindrical insert configured for retaining at least one cleaning implement.

6 Claims, 6 Drawing Sheets

COUP CLEANING CART

BACKGROUND

Recently, it has become a fad in the United States for individuals to raise chickens in their backyards. This has given rise to suburban backyard chicken coops. The coops are typically a size suitable for use in a backyard. Thus, due to the size of the chicken coops, an individual may not enter the coop. The chicken coops typically have nesting structures on which the chickens being housed may roost and lay eggs. These nesting structures often have external access.

It is often necessary to clean the residential coups. Cleaning the chicken coups may require various implements. The implements may be, for example, a scooper and a brush.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure relates to a coup cleaning cart in accordance with an embodiment of the present disclosure. The exemplary coup cleaning cart comprises a frame that supports and carries a storage can. Within the storage can axe cleaning implements, which can include, for example, a scoop, a brush, or any other type of cleaning implement. In use, the cart is transported within proximity of a coup, and a user may use cleaning implements stored within the storage can to clean the coup.

In one embodiment, the storage can comprises a storage can insert that fits within a cylindrical housing. In the insert is a slot through which a user can insert his/her hand to lift the insert from the housing to gain access to the implements so that the implements can be removed for use. On each side of the storage can are handles that allow a user to lift the storage can from the frame.

Figure 1:
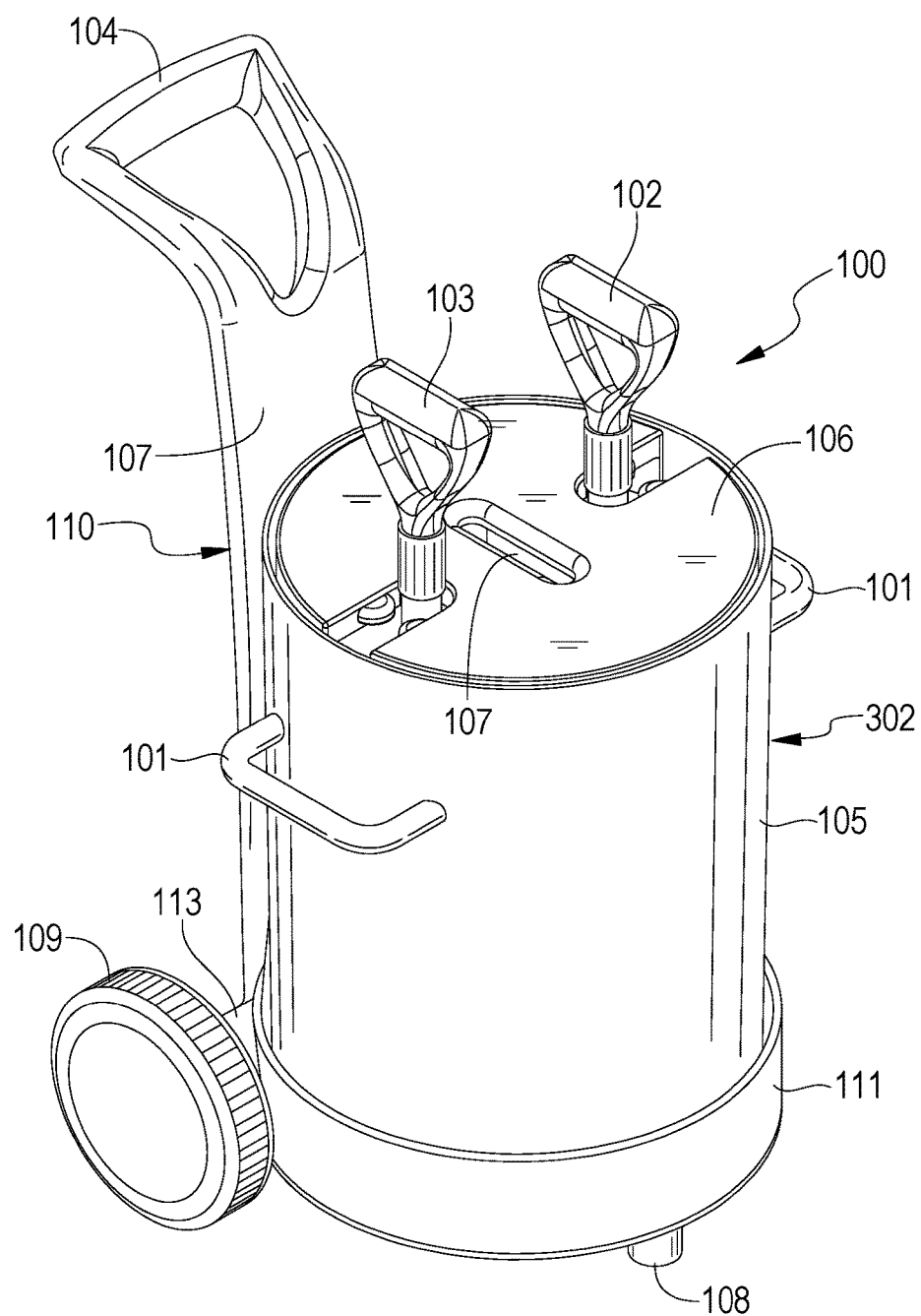
FIG. 1 is a perspective view of a cart for storing and transporting cleaning implements in accordance with an embodiment of the present disclosure.

FIG. 1 is a perspective view of coup cleaning cart 100 in accordance with an embodiment of the present disclosure. The coup cleaning cart 100 comprises a frame 110 and a storage can 302.

The frame 110 comprises a cylindrical base 111, an axle 113, a spine 107, and a handle 104. The handle 104 is coupled to the cylindrical base 111 and the axle 113 via the vertical spine 107. In one embodiment, the handle 104, the spine 107, the axle 113, and the cylindrical base 111 may be integrally formed from a single mold. However, the handle 104, the spine 17, the axle 113 and the cylindrical base may be separate parts coupled together via fasteners.

Coupled to each side of the axle is a wheel 109. Further, a wheel 108 is coupled to the bottom of the cylindrical base 111. Notably, three wheels, including the back wheels 109 and the front wheel 108, are shown in FIG. 1. However, fewer or more wheels may be used in other embodiments.

The storage can 302 comprises a cylindrical housing 105 and a can insert 106. The can insert 106 fits within the cylindrical housing 105. The can insert 106 retains the implements 103 and 102. During use, the can insert 106 is removed from the cylindrical housing 105 via a handle 107 in the top of the can insert 106. The implements 103 and 102 are then removed for cleaning a coup.

Additionally, the storage can 302 may also be removed from the frame 110. In this regard, coupled to each side of the cylindrical housing 302 is a handle 101. In use, the user may grasp the handles 101 and remove the storage can 302 from the frame 110 for cleaning.

Figure 2:
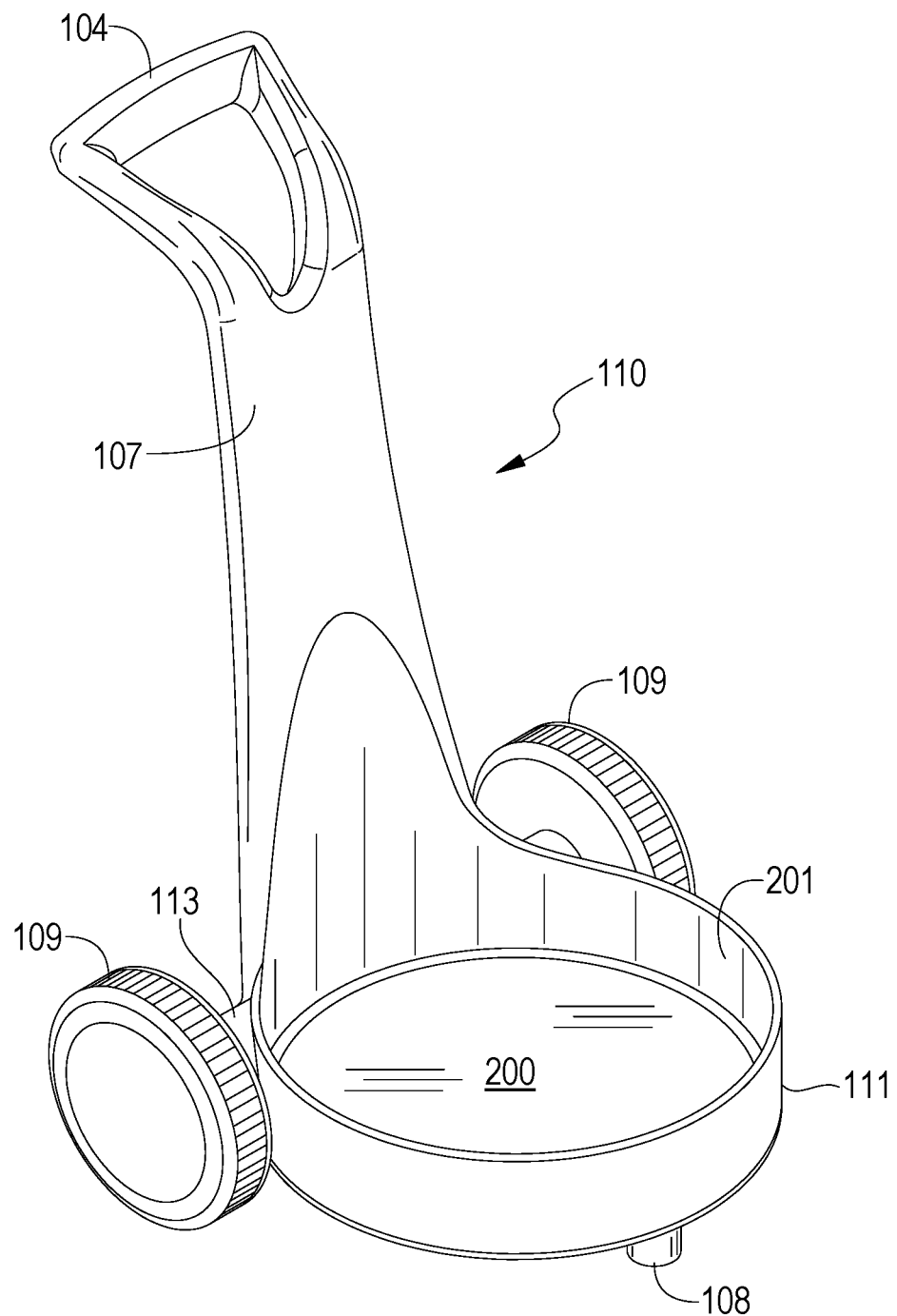
FIG. 2 is a perspective view of a frame such as is depicted in FIG. 1.

FIG. 2 is a perspective view of the frame 110. The frame 110 comprises the cylindrical base 111 having a wall 201 that forms a cylindrical bed 200. The cylindrical bed 200 is cylindrical for removeably receiving the storage can 302. In this regard, during use, the cylindrical housing 302 (FIG. 1) may be inserted in the cylindrical bed 200 and transported to a chicken coup for cleaning.

The frame 110 further comprises the back wheels 109 that are coupled together via the axle 113. Also, the frame 110 comprises the front wheel 108 coupled to the underside of the cylindrical base 111. The wheels 109 and 108 are adapted and arranged for transporting the cart 100, for example to a chicken coup 100.

The frame 110 further comprises the spine 107 that couples the handle 104 to the axle 113 and the cylindrical base 111. Note that in one embodiment, the cylindrical base 111 is integral with the spine 107 than extends vertically and terminates with a handle 104. However, the cylindrical base 111, the axle 113, the spine 107, and the handle 104 may be separate parts coupled together via fasteners in other embodiments.

Figure 3:
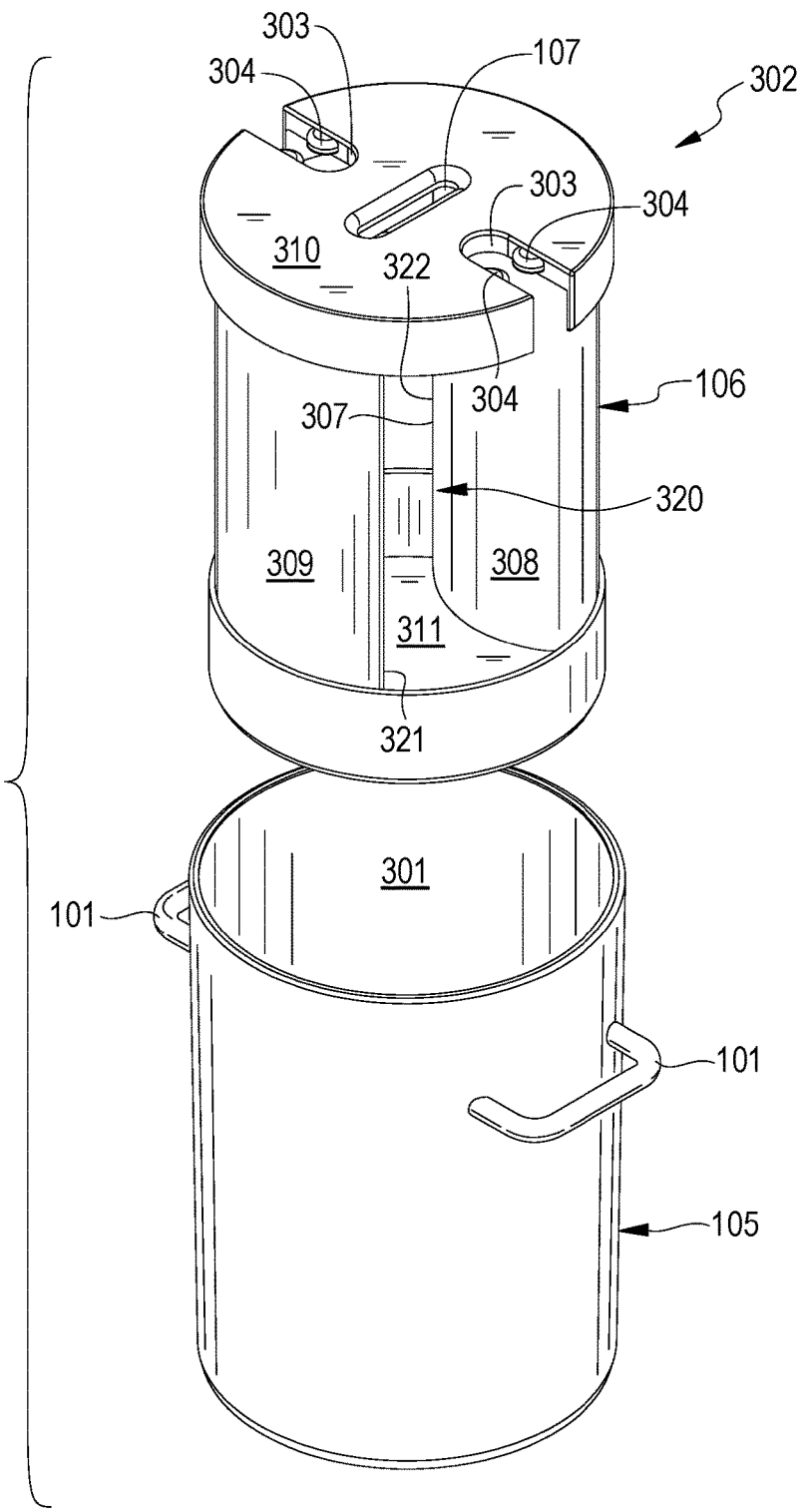
FIG. 3 is a perspective view of a storage can such as is depicted in FIG. 1.

FIG. 3 is a perspective exploded view of a storage can 302. The storage can 302 comprises the cylindrical housing 105 and the can insert 106. In use, the can insert 106 is inserted within the cylindrical housing 105, which is then placed on the frame 110 (FIG. 2).

The can insert 106 comprises an upper cover 310 and a lower cover 311. The upper cover 310 comprises a slotted opening 107 for receiving a user's hand (not shown). In this regard, a user inserts his/her hand in the slot 107 and lifts the can insert 106 from the cylindrical housing 105 to gain access to the cleaning implements 103, 102 (FIG. 1).

Further, the upper surface 310 comprises slots 303. Each slot 303 is configured for receiving an implement 103, 102. Within each slot are protrusions 304. The protrusions 304 are flexible such that the protrusions 304 give, allowing the implement to be fully inserted, retained, and easily removed.

The can insert 106 further comprises partial walls 308 and 309. The partial walls 308 and 309 extend from the upper cover 310 to the bottom cover 310. The upper cover 310, the bottom cover 311, and the partial walls 308 and 309 form a partially open cavity 320. The partial walls 308 and 309 form openings 321 and 322. The openings 321 and 322 are aligned with the slots 303 and are configured for receiving the implements 102, 103 (FIG. 1) when inserted into the slots 303. Notably, the partial walls 308 and 309 define the cavity 320 so that the implements inserted in the slots 303 can be housed within the cavity 320.

Figure 4:
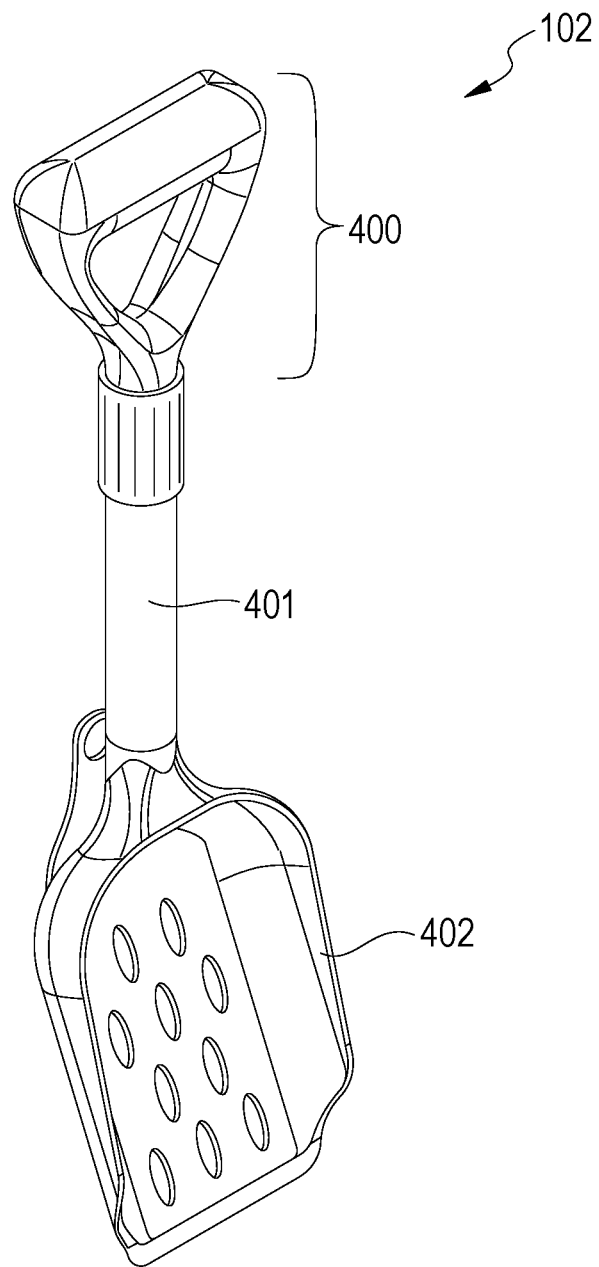
FIG. 4 is a perspective view of a scoop such as is depicted in FIG. 1.

FIG. 4 is a perspective view of an implement 102 that can be inserted into slot 303 (FIG. 3). The implement 102 comprises a handle 400 that is coupled to a scoop 402 via a coupling member 401. The coupling member 401 is sized such that it fits within the protrusions 304 of the slot 303 formed in the upper cover 310 of the can insert 106. Thus, the implement 102 can be easily inserted and removed from the slot 303 during use.

Figure 5:
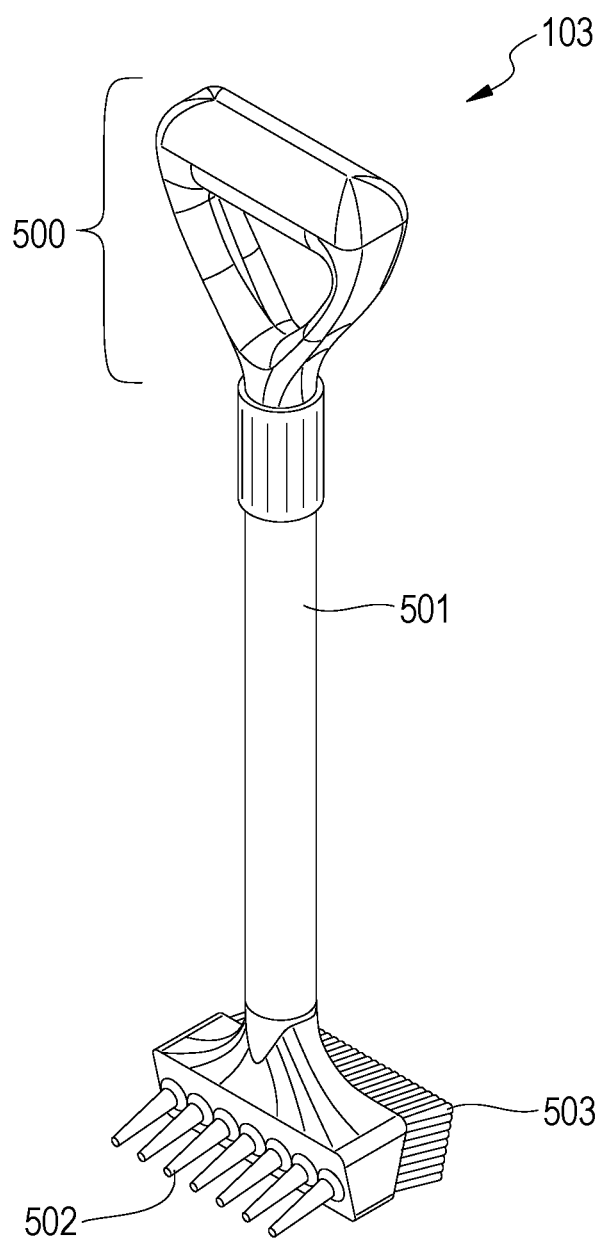
FIG. 5 is a front perspective view of a brush such as is depicted in FIG. 1.

FIG. 5 is a front perspective view of an exemplary implement 103. The implement 103 comprises a handle 500, a rake 502 and a brush 503. The handle 500 is coupled to the rake 502 and the brush 503 via a coupling member 501. The brush 503 is configured to scrub or clean surfaces of the chicken coup, and the rake 502 is configured to rake hay where the chickens may lay their eggs. The coupling member 501 is sized such that it fits within the protrusions 304 of the slot 303 formed in the upper cover 310 of the can insert 106. Thus, the implement 103 can be easily inserted and removed from the slot 303 during use.

Figure 6:
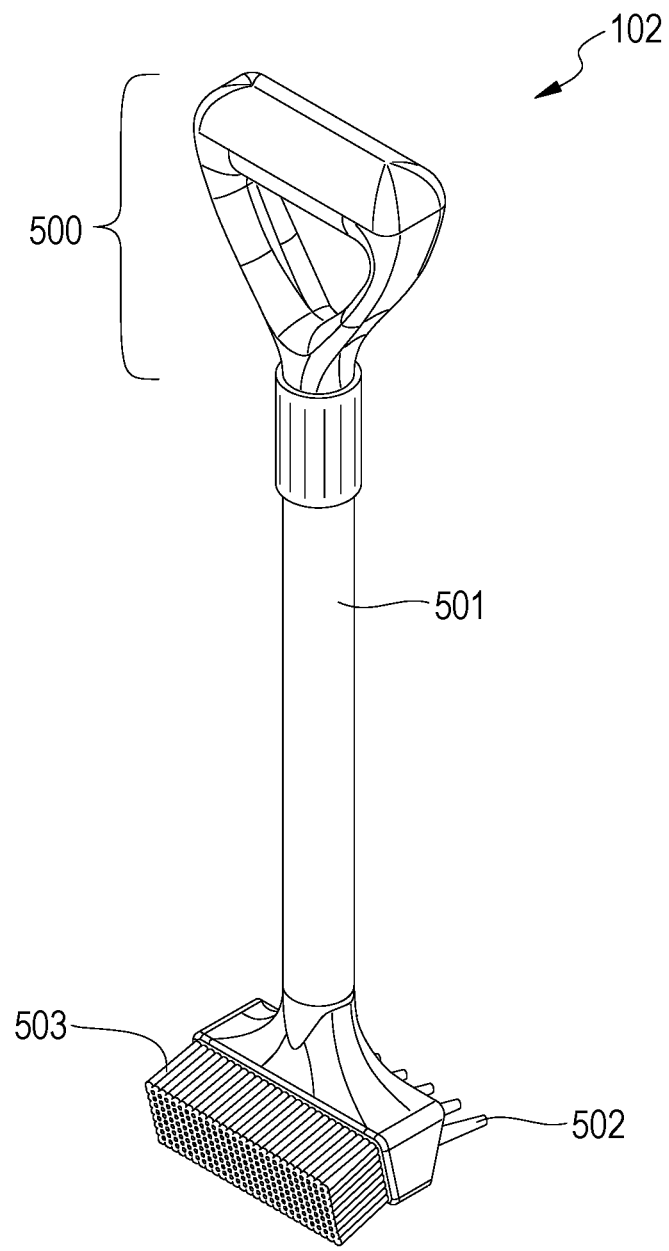
FIG. 6 is a back perspective view of the brush such as is depicted in FIG. 5.

FIG. 6 is a back perspective view of the implement 103. The implement 103 comprises the handle 500, the rake 502, and the brush 503. The handle is coupled to the rake 502 and the brush 503 via a coupling member 501.

What is claimed is:

1. A cart, comprising:
   a frame, the frame comprising a handle coupled to an axle and a cylindrical base;
   at least two wheels coupled to the axle;
   a third wheel coupled to an underside of the cylindrical base;
   a cylindrical housing removeably situated within the cylindrical base; and
   a cylindrical insert removeably housed with the cylindrical housing the cylindrical insert configured for retaining at least two cleaning implements, wherein the cylindrical insert comprises at least two partial walls creating at least two openings aligned with at least two slots in an upper cover of the cylindrical insert for receiving the at least two cleaning implements.

2. The cart of claim 1, wherein the handle, the axle, and the cylindrical base are separate pieces coupled together via fasteners.

3. The cart of claim 1, further comprising at least one handle coupled to an outside surface of the cylindrical housing.

4. The cart of claim 1, wherein the upper cover comprises a central slot configured for receiving a user's band and for removing the cylindrical insert from the cylindrical housing.

5. The cart of claim 1, wherein the at least two slots comprise protrusions for retaining the at least two cleaning implements in the at least two slots.

6. The cart of claim 1, herein the handle, the axle, and the cylindrical base, are integrally formed.

* * * * *